Patented Feb. 16, 1954

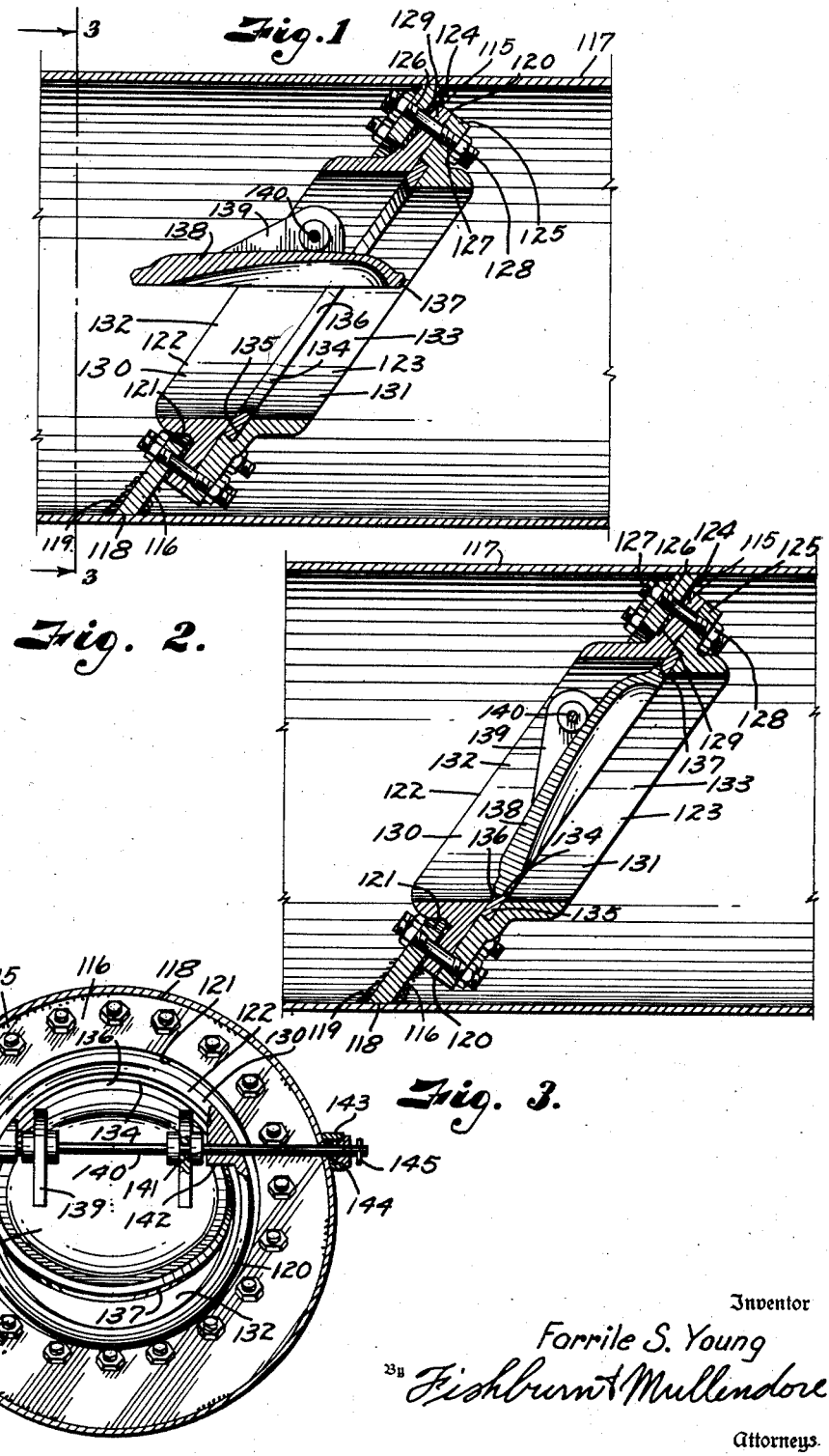

2,669,419

UNITED STATES PATENT OFFICE 2,669,419

WELD IN PIPE LINE VALVE STRUCTURE

Farrile S. Young, Houston, Tex., assignor to Panhandle Eastern Pipe Line Company, Kansas City, Mo., a corporation of Delaware Application August 23, 1950, Serial No. 180,926

3 Claims. (Cl. 251—123)

This invention relates to valve structures and more particularly to such a structure wherein the valve mechanism is welded or otherwise secured in a pipe line or section thereof.

The objects of the present invention are to provide a valve structure welded or otherwise secured inside of a pipe line or section thereof eliminating the necessity of a conventional valve body; to provide a tubular member of metal or other suitable material with a valve structure suitably secured therein which may be connected in a pipe line and form a part thereof; to provide a valve structure slidable longitudinally into a pipe line and welded therein in alignment with an aperture in the wall of the pipe line through which the valve operating member extends; to provide a valve structure utilizing the pipe line as a housing thereby eliminating body castings and flanges for either low or high pressure service; and to provide a valve structure which is simple and economical to manufacture and install in pipe lines for controlling the flow therethrough.

In accomplishing these and other objects of the present invention, I have provided improved details of structure, the preferred forms of which are illustrated in the accompanying drawings, wherein:

Fig. 1 is a longitudinal sectional view through a pipe line and check valve structure therein with the valve in open position.

Fig. 2 is a longitudinal sectional view of the pipe line and valve structure with the valve in closed position.

Fig. 3 is a transverse sectional view through the pipe line and valve structure taken on the line 3—3, Fig. 1, with portions broken away to show the mounting of the tilting disk.

Referring more in detail to the drawings:

The device or structure of the present invention is applicable generally to pipe lines, for example, gas and oil pipe lines in which it is customary to use many large valves having very heavy and expensive body castings which may have flanges or other provisions for connecting the valves into the pipe line.

In the form of the invention illustrated, the valve structure is of the non-slam tilting disk internal type check valve. However, other types of check valves may be mounted in the pipe line in a similar manner, as by welding whereby the pipe lines serve as a body or housing of the valve. The check valve mechanism 115 includes a ring like member 116 arranged in a pipe line 117 or sections thereof and an angle to the direction of fluid flow through the line with the periphery 118 of the ring like member shaped to have substantially continuously engagement therearound with the inner surface of the pipe line, said ring like member being suitably secured as by welding 119 to said pipe line, the welding extending completely around the ring to prevent leakage of fluid between the ring and pipe line.

The sectional body member 120 is arranged in the opening 121 of the ring like member and preferably includes a forward member or section 122 and a rear member or section 123 each of which have flanges arranged in planes parallel to the plane of the ring like member 116, said flanges having substantially flat adjacent faces. The flanges 124 and 125 of the body sections 122 and 123 have registering apertures which are aligned with apertures 126 in the ring member 116 to receive bolts 127 with nuts 128 threaded thereon for drawing the flanges 124 and 125 and ring member 116 together and rigidly secure the body sections to the ring member. It is preferable that a gasket 129 be arranged between the flange 124 and the ring member 116 to prevent leakage therebetween. The body sections 122 and 123 have oppositely directed annular flanges 130 and 131 which form flow channels or passageways 132 and 133 preferably substantially coaxial with the pipe line 117.

A seat member 134 is disposed in an annular recess 135 in the face of the rear member and clamped therein between the body sections. Said seat member having a tapered bore or seat 136 adapted to be engaged by the peripheral edges 137 of a disk valve member 138 which has ears 139 fixed to a rod 140 that is disposed at a side of the axis of the disk valve member and rotatably mounted in bores 141 of bosses 142 on the annular flange 131 of the body section 122. The rod 140 preferably extends through the sidewalls of the pipe line and a suitable boss 143 welded on the outside of said pipe line for receiving suitable packing and packing gland 144 to prevent leakage around the rod 140, said rod preferably has a suitable pin 145 or the like secured adjacent the outer ends thereof for indicating the position of the valve disk 138.

It is believed obvious that I have provided a valve structure adapted to be welded inside of a pipe, thereby eliminating large castings and forming a simple, economical valve structure that will operate efficiently in controlling flow of fluids through the pipe line.

What I claim and desire to secure by Letters Patent is:

1. A valve of the character described comprising, a section of a pipe of substantially uniform size and adapted to be welded in a pipe line, a ring member having a periphery closely fitting and slidable inside of the pipe line section for positioning of said ring member, a weld extending around the periphery of the ring member and securing the ring member in selected position in the pipe line section, said weld forming a seal against leakage between the ring member and pipe line section, separable forward and rear members with substantially aligned passageways therethrough, means for securing said members together and to the ring member in fluidtight relationship, said members having substantially flat adjacent faces arranged at an angle to the direction of fluid flow through the pipe line section, the face of the rear member provided with a recess around the passageway thereof, a seat member seated in said recess provided with a passageway therethrough and a tapering seat around the passageway on the face thereof adjacent the forward member, the face of the forward member provided with a portion overlying the marginal portions of said face of the seat member, a disk for engaging said seat of the seat member, and pivotal connections connecting said disk and forward member disposed at a side of the axis of the disk and wholly within the passageway of the forward member for swinging movement of the disk between closed and open positions in said passageway and independently thereof, whereby as fluid flowing through the valve moves the disk to open position the pivotal connections are at a side of said disk away from the axis of the passageways and out of the central main flow of fluid.

2. A valve of the character described comprising, a pipe section of substantially uniform size adapted to be welded in a pipe line through which flow of fluid is to be regulated, a body member having a periphery closely fitting and slidable inside the pipe section for positioning of said body member, a weld extending around the periphery of the body member and securing the body member to the pipe section in selected position, said weld forming a seal against leakage between the body member and pipe section, said body member having a flow passage therethrough longitudinally of the pipe and a tapering seat extending around the flow passage, a disk valve member engageable with the seat for opening and closing the flow passage, and means pivotally connecting the disk valve member to the body member at one side of the axis of the disk valve member whereby as fluid flowing through the flow passage moves the disk valve member to open position the pivotal connecting means is at a side of the disk valve member away from the axis of the flow passage and out of the central main flow of fluid.

3. A valve of the character described comprising, a pipe section of substantially uniform size adapted to be welded in a pipe line through which flow of fluid is to be regulated, a ring member having a periphery closely fitting and slidable inside the pipe section for positioning of said ring member, the periphery of the ring member being secured to the pipe section in selected position by a weld extending around said periphery, said weld forming a seal against leakage between the ring member and pipe section, said ring member having a flow passage therethrough longitudinally of the pipe and a tapering seat extending around the flow passage and arranged at an angle to the direction of fluid flow through the flow passage, a disk valve member engageable with the seat for opening and closing the flow passage, and connections associated with said ring member and disk valve member pivotally connecting same at one side of the axis of the disk valve member whereby as fluid flowing through the flow passage moves the disk valve member to open position the pivotal connections are at a side of the disk valve member away from the axis of the flow passage and out of the central main flow of fluid.

FARRILE S. YOUNG.

References Cited in the file of this patent

UNITED STATES PATENTS

| Number | Name | Date |
|---|---|---|
| 2,301,176 | Elliott | Nov. 10, 1942 |
| 2,356,815 | Bishoff | Aug. 29, 1944 |
| 2,363,943 | Carlson | Nov. 28, 1944 |
| 2,414,751 | Ludeman | Jan. 21, 1947 |

FOREIGN PATENTS

| Number | Country | Date |
|---|---|---|
| 380,951 | Italy | 1940 |